(12) United States Patent
Li

(10) Patent No.: US 11,449,108 B2
(45) Date of Patent: Sep. 20, 2022

(54) FLEXIBLE HINGE DEVICE

(71) Applicant: Microsoft Technology Licensing, LLC, Redmond, WA (US)

(72) Inventor: Han Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/880,355

(22) Filed: May 21, 2020

(65) Prior Publication Data
US 2021/0278882 A1 Sep. 9, 2021

Related U.S. Application Data

(60) Provisional application No. 62/985,668, filed on Mar. 5, 2020.

(51) Int. Cl.
*G06F 1/16* (2006.01)

(52) U.S. Cl.
CPC .................... *G06F 1/1681* (2013.01)

(58) Field of Classification Search
CPC ..................................... G06F 1/1681
See application file for complete search history.

(56) References Cited

U.S. PATENT DOCUMENTS

| | | | | |
|---|---|---|---|---|
| 5,224,023 A * | 6/1993 | Smith | ............... | G06F 1/184 174/254 |
| 5,463,794 A | 11/1995 | Erland | | |
| 5,495,076 A * | 2/1996 | Davis | ............... | B60R 16/0215 174/250 |
| 5,612,840 A * | 3/1997 | Hiraoka | ............ | G11B 5/4833 360/245.9 |
| 5,924,873 A * | 7/1999 | Barcley | ............ | H05K 3/363 439/67 |
| 6,396,709 B1 * | 5/2002 | Schmich | .......... | H05K 1/028 361/749 |
| 6,778,139 B2 * | 8/2004 | Suzuki | ............. | H01Q 1/38 343/700 MS |
| 7,545,649 B2 * | 6/2009 | Tan | .................. | H05K 1/028 174/254 |
| 7,685,676 B2 * | 3/2010 | Mc Clellan | ....... | E05D 1/02 16/225 |
| 8,093,502 B2 * | 1/2012 | Mikado | ............. | H05K 3/4691 174/255 |

(Continued)

FOREIGN PATENT DOCUMENTS

| | | |
|---|---|---|
| CN | 208141720 U | 11/2018 |
| DE | 4224699 A1 | 1/1994 |
| KR | 20190003257 A | 1/2019 |

OTHER PUBLICATIONS

Gardiner, Ginger, "Carbon-Kevlar Hinge", Retrieved from: https://www.compositesworld.com/blog/post/carbon-kevlar-hinge-, Oct. 30, 2017, 9 pages.

(Continued)

*Primary Examiner* — Anthony M Haughton
*Assistant Examiner* — Theron S Milliser
(74) *Attorney, Agent, or Firm* — Rainier Patents, P.S.

(57) ABSTRACT

The present description relates to flexible hinges and hinged devices. One example device includes a first portion and a second portion. The example also includes a relieved flexible hinge rotatably securing the first and second portions.

20 Claims, 10 Drawing Sheets

(56) References Cited

U.S. PATENT DOCUMENTS

| | | | |
|---|---|---|---|
| 8,294,031 B2* | 10/2012 | Bagung | H05K 3/3452 174/254 |
| 8,438,702 B2 | 5/2013 | Apgar et al. | |
| 9,089,071 B2* | 7/2015 | Dangler | H05K 3/4635 |
| 9,354,476 B2* | 5/2016 | Han | G06F 1/1626 |
| 9,379,355 B1* | 6/2016 | Lee | B32B 5/18 |
| 9,710,021 B2* | 7/2017 | Kauhaniemi | G06F 1/1652 |
| 9,935,281 B2* | 4/2018 | Kim | H01L 27/3276 |
| 9,947,882 B2* | 4/2018 | Zhang | H01L 51/5253 |
| 10,303,218 B2* | 5/2019 | Jones | G06F 1/1618 |
| 10,502,991 B2* | 12/2019 | Yu | G02F 1/133305 |
| 10,515,570 B2* | 12/2019 | Ha | H01L 51/56 |
| 10,516,119 B2* | 12/2019 | Lee | H01L 51/5256 |
| 10,532,428 B2* | 1/2020 | Russell-Clarke | B23K 26/38 |
| 10,559,768 B2* | 2/2020 | Han | H01L 51/5237 |
| 10,579,105 B2* | 3/2020 | Jones | H05K 1/028 |
| 10,665,823 B2* | 5/2020 | Kim | H01L 23/552 |
| 10,770,678 B2* | 9/2020 | Hu | G06F 1/1652 |
| 10,845,848 B2* | 11/2020 | Jones | G06F 1/1626 |
| 10,950,824 B2* | 3/2021 | Kim | H01L 23/552 |
| 11,009,921 B1* | 5/2021 | Bharadwaj | G09F 9/301 |
| 11,048,295 B1* | 6/2021 | Smeeton | G06F 1/1609 |
| 2006/0225914 A1* | 10/2006 | Tan | H05K 1/028 174/254 |
| 2007/0199176 A1* | 8/2007 | Mc Clellan | E05D 1/02 16/224 |
| 2007/0281499 A1* | 12/2007 | Muro | H05K 1/0278 439/26 |
| 2008/0179079 A1* | 7/2008 | Ishii | H05K 1/028 174/254 |
| 2008/0289859 A1* | 11/2008 | Mikado | H05K 1/0281 174/254 |
| 2012/0187672 A1 | 7/2012 | Sakagami et al. | |
| 2013/0087375 A1* | 4/2013 | Tsunoi | H05K 1/0278 174/260 |
| 2013/0216740 A1* | 8/2013 | Russell-Clarke | B65D 85/00 428/33 |
| 2015/0040349 A1 | 2/2015 | Malia et al. | |
| 2015/0043174 A1* | 2/2015 | Han | G06F 1/1626 361/749 |
| 2016/0172623 A1* | 6/2016 | Lee | H01L 51/5253 257/40 |
| 2016/0231784 A1* | 8/2016 | Yu | G02F 1/133305 |
| 2017/0304948 A1* | 10/2017 | Russell-Clarke | B21D 31/04 |
| 2018/0062090 A1* | 3/2018 | Kim | H01L 27/3276 |
| 2018/0102496 A1* | 4/2018 | Kim | H01L 23/552 |
| 2018/0217639 A1* | 8/2018 | Jones | G06F 1/1652 |
| 2018/0370613 A1 | 12/2018 | Van pelt et al. | |
| 2019/0067606 A1* | 2/2019 | Han | H01L 51/5237 |
| 2019/0265756 A1* | 8/2019 | Jones | G06F 1/1652 |
| 2019/0348629 A1* | 11/2019 | Hu | G06F 1/1637 |

OTHER PUBLICATIONS

"International Search Report and Written Opinion Issued in PCT Application No. PCT/US2021/014256", dated May 4, 2021, 16 Pages.

* cited by examiner

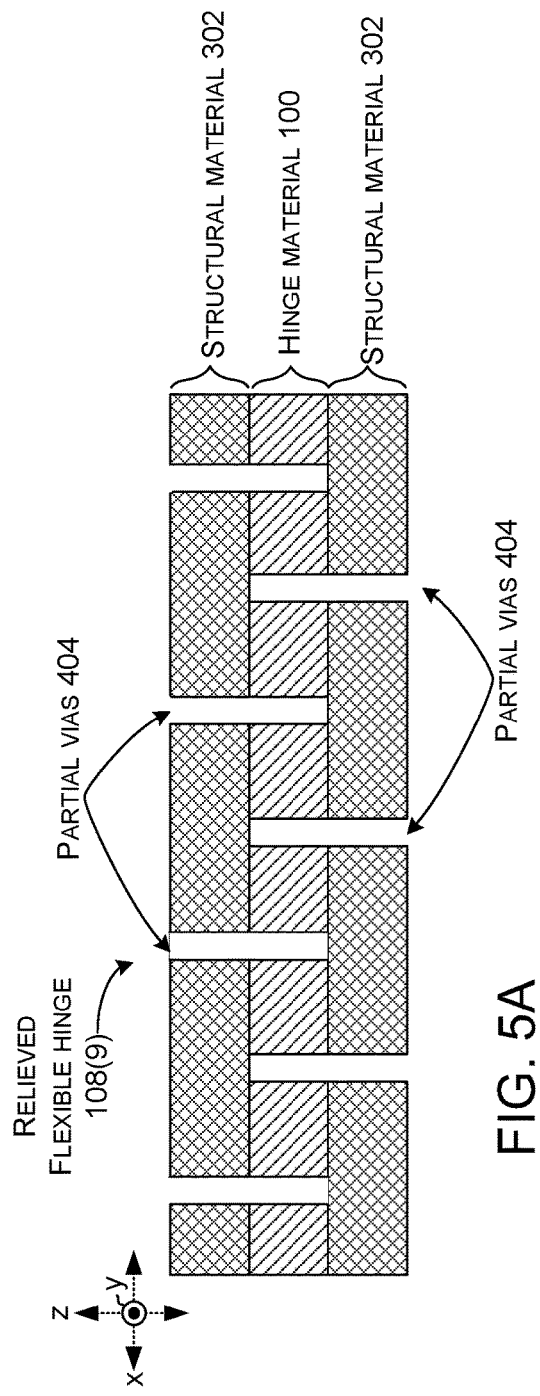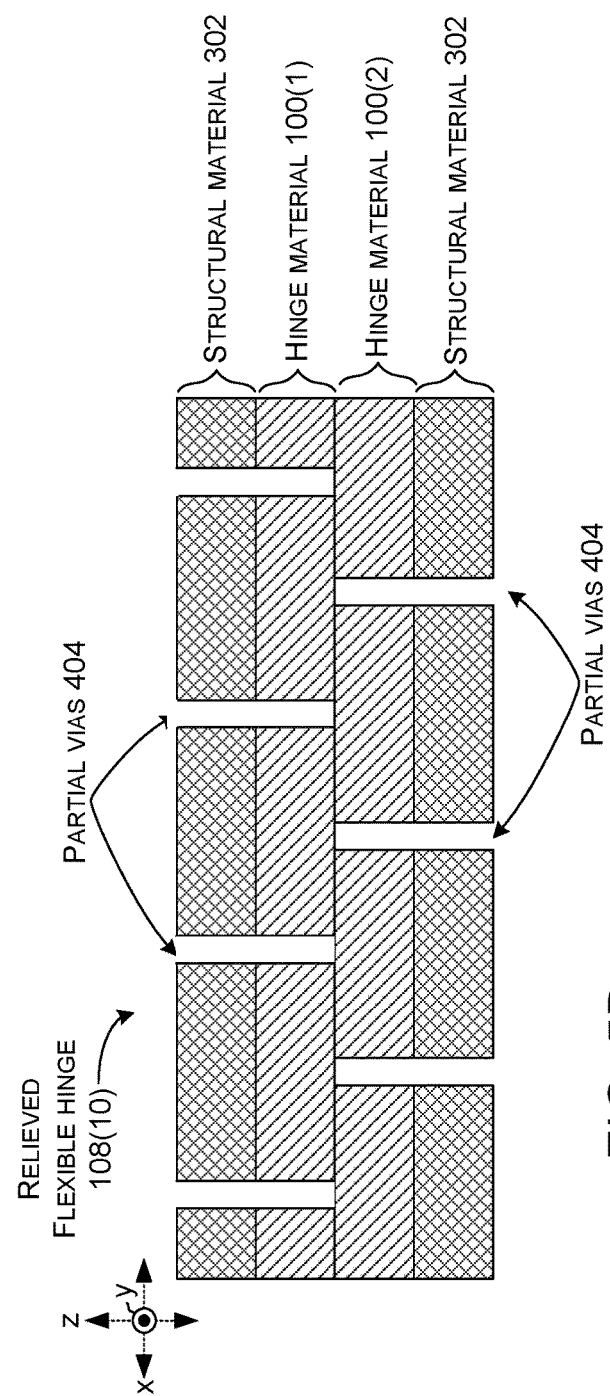

FLEXIBLE HINGE DEVICE

PRIORITY

This application is a utility application that claims priority from U.S. Provisional Application No. 62/985,668, filed Mar. 5, 2020, which is hereby incorporated by reference in its entirety.

BACKGROUND

Flexible hinges are employed in many device scenarios. Flexible hinges are often constructed from a single material or a composite material. For instance, a fabric may be impregnated (or otherwise coated) with a resin to form a composite flexible hinge. Several parameters affect the properties of these flexible hinges. Examples of such parameters can include types of fibers, fibers' modulus/strength, types of matrix resins, resins' modulus/strength, types of weaves, and/or the layup of woven layers. These parameters affect the mechanical properties of composite hinges, which define the hinge performance. In conventional ways, the hinge performance is optimized by running complicated design of experiments (DOEs), which cost time, money, and effort. Moreover, deviations of the composite material itself and/or the manufacturing processes may cause deviations of hinge performance. However, after the composite layup is cured, it is impossible to change the composite hinge's mechanical properties and adjust the hinge's performance back to design specifications. The present concepts address these and other issues by allowing a single flexible hinge to be customized for different use case scenarios.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 3A-3C, 4D, 5A, 5B, and 11A-12B show sectional views of example devices in accordance with some implementations of the present concepts.

DESCRIPTION

The present concepts relate to devices, such as computing devices employing flexible hinges that can rotationally secure first and second device portions. A flexible hinge can be selected based upon various criteria. This flexible hinge can be customized for various different device applications by relieving hinge material to promote desired hinge properties for individual device applications.

Figure 1:
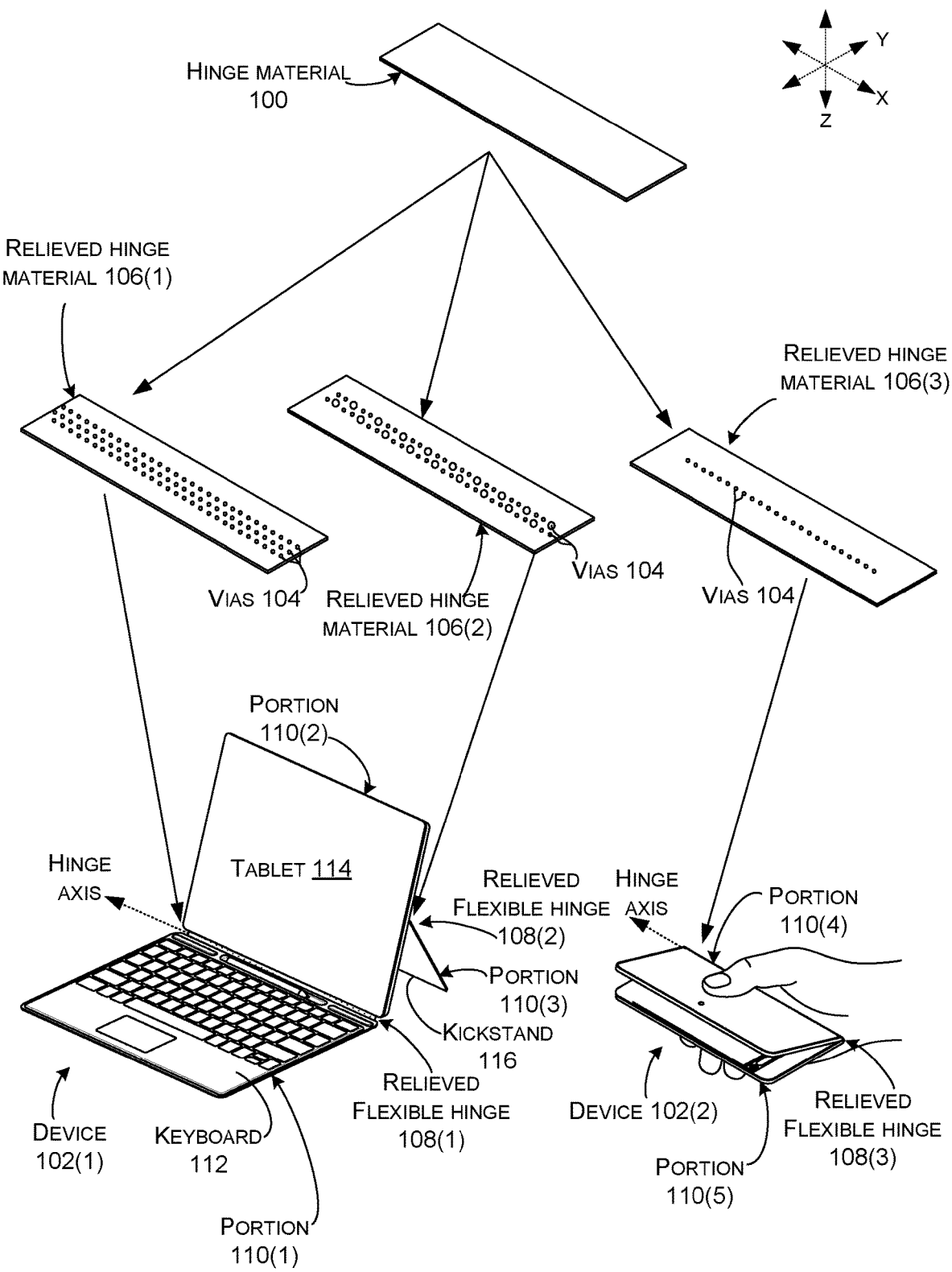
FIG. 1 shows a perspective view of example devices in accordance with some implementations of the present concepts.

Introductory FIG. 1 shows an example flexible hinge material ("hinge material") 100 and three different configurations of hinged devices 102. This flexible hinge material 100 can be a single piece of material, such as a rubber material, a fabric, or a composite, such as a fabric impregnated with resin (e.g., fabric-resin composite material), among other configurations. The hinge material 100 may have been extensively tested and produced desired characteristics, such as durability and resistance to crimping or creasing, among others.

The differing hinge applications of the two devices 102(1) and 102(2) may have different hinge design properties, such as stiffness, hinge radius, etc. The hinge material 100 can be customized to produce these different hinge design properties. The customization of the hinge material 100 can include relieving the hinge material with vias 104 to form relieved hinge material 106. The relieved hinge material can contribute to a relieved flexible hinge 108 for rotatably securing device portions 110.

In this case, the hinge material 100 intended for a specific hinge application on an individual device 102 can be relieved in a manner that provides the desired design properties for rotatably securing device portions 110. In this example, relative to device 102(1), a first portion 110(1) is manifest as a keyboard 112, a second portion 110(2) is manifest as a tablet 114, and a third portion 110(3) is manifest as a kickstand 116.

For the hinge application of device 102(1) between keyboard 112 and tablet 114, the relieved hinge material 106(1) may include three parallel rows of linearly arranged vias 104 formed through the hinge material 100 along the hinge axis. As used herein, the term 'via' means a hole of any shape that goes partially or entirely through a thickness of the relieved hinge material 106.

In the example of device 102(1), the desired hinge properties for the relieved flexible hinge 108(1) between the keyboard 112 and the tablet 114 may be a relatively large hinge radius and a low friction (e.g., easy to rotate) hinge. The three parallel rows of vias 104 of the relieved hinge material 106(1) can promote these properties.

Also relative to device 102(1), the desired hinge properties for the relieved flexible hinge 108(2) between the tablet 114 and kickstand 116 may be a relatively high resistance hinge with a smaller hinge radius. The selected relieved hinge material 106(2) can provide these properties.

In the example of device 102(2), relieved flexible hinge 108(3) can rotatably secure portions 110(4) and 110(5) through a range of orientations. In this case, the desired hinge properties may be a relatively small hinge radius and additional hinge strength at the ends of the hinge, which are subject to increased stress forces. The single row of vias 104 that are spaced back from each end of the relieved hinge material 106(3) may provide these desired hinge properties in the relieved flexible hinge 108(3).

Of course, these three example configurations are provided for purposes of explanation and other relieved hinge material 106 configurations are contemplated and further examples are described below. Thus, the discussion relative to FIG. 1 explains that a generic hinge material 100 can be used for a given hinge application and can be relieved by different designs of vias 104 to achieve various specific hinge properties. Note that the relieved hinge material 106 can be secured to the device portions utilizing traditional techniques, which are therefore not described in further detail.

Figure 2A:
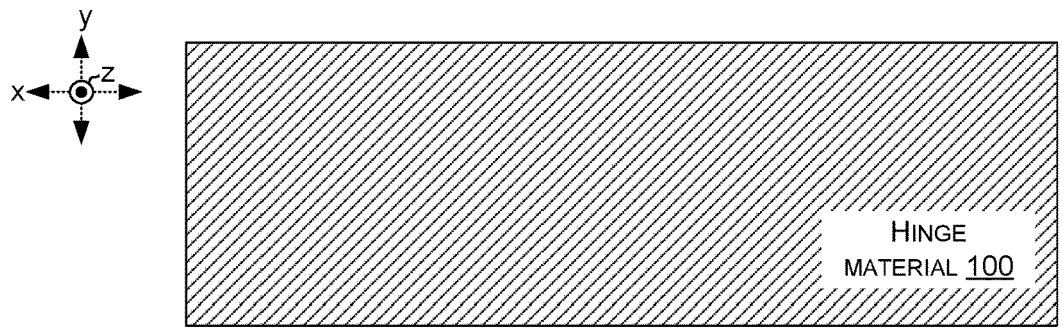
FIGS. 2A-2D, 4A-4C, and 6-10 show elevational views of example devices in accordance with some implementations of the present concepts.
Figure 2B:
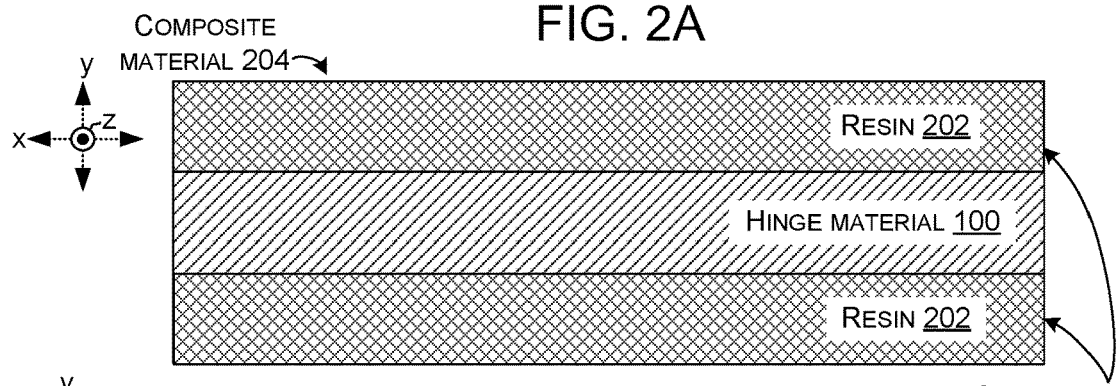

FIGS. 2A-2D collectively show other relieved hinge material configurations. FIG. 2A shows a hinge material 100, such as a fabric material. In some cases, the hinge material could be a woven Kevlar fabric material. FIG. 2B shows areas of the hinge material, such as the Kevlar fabric material impregnated with a resin (type material) 202 to create a composite material 204. The composite material 204 has at least some composite regions 206 where the hinge material 100 is impregnated with resin 202.

Figure 2C:
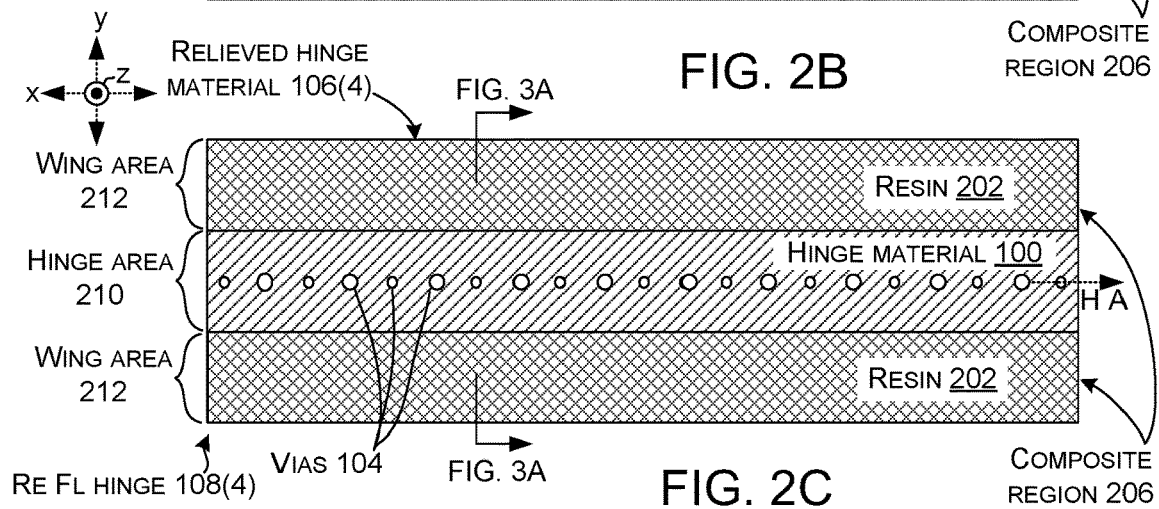

FIG. 2C shows vias 104 formed through the hinge material 100 to produce a relieved hinge material 106(4). The vias 104 can be oriented relative to a hinge axis (HA) to promote desired hinge properties, such as resistance to bending. In this case, the vias 104 have two dissimilar sizes; a smaller size alternating with a larger size. In other implementations, such as those illustrated relative to relieved hinge material 106(1) of FIG. 1, the vias are the same size.

Figure 2D:
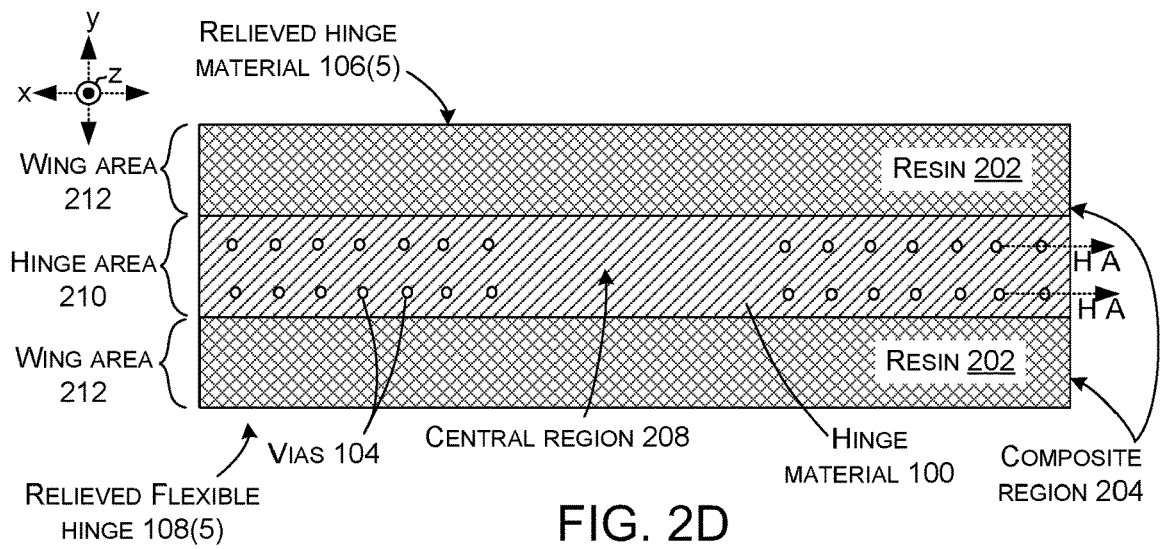

FIG. 2D shows an alternative configuration to FIG. 2C relating to relieved hinge material 106(5). In the case of FIG. 2D, the vias 104 form two lines, which can define hinge axes. This pattern can facilitate uniform bending around the hinge axes. In this case, the vias are not evenly spaced in that no vias 104 are formed in a central region 208. In this example, conductors (not shown) may pass through the central region 208 from an upper or first portion of the device to a lower or second portion of the device (See device portions in FIG. 1). Omitting vias 104 proximate to the conductors may reduce damage to the conductors over a lifetime of opening and closing of the relieved flexible hinge 108(5), while the vias 104 in the remaining areas promote other desired hinge properties.

From one perspective, the vias 104 can be viewed as being formed in a hinge area 210, which is interposed between two wing areas 212. The relieved hinge material 106(5) can be secured to the device via the wing areas 212 to form relieved flexible hinge 108(5).

Figure 3A:
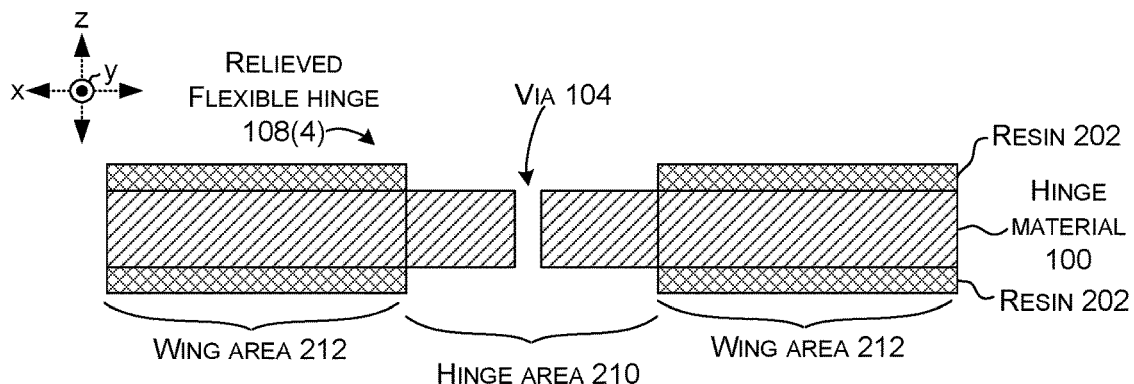
Figure 3B:
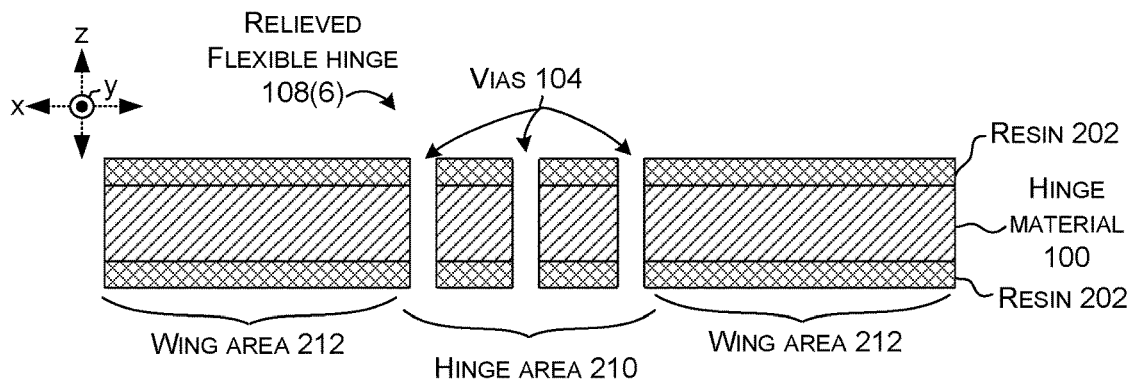
Figure 3C:
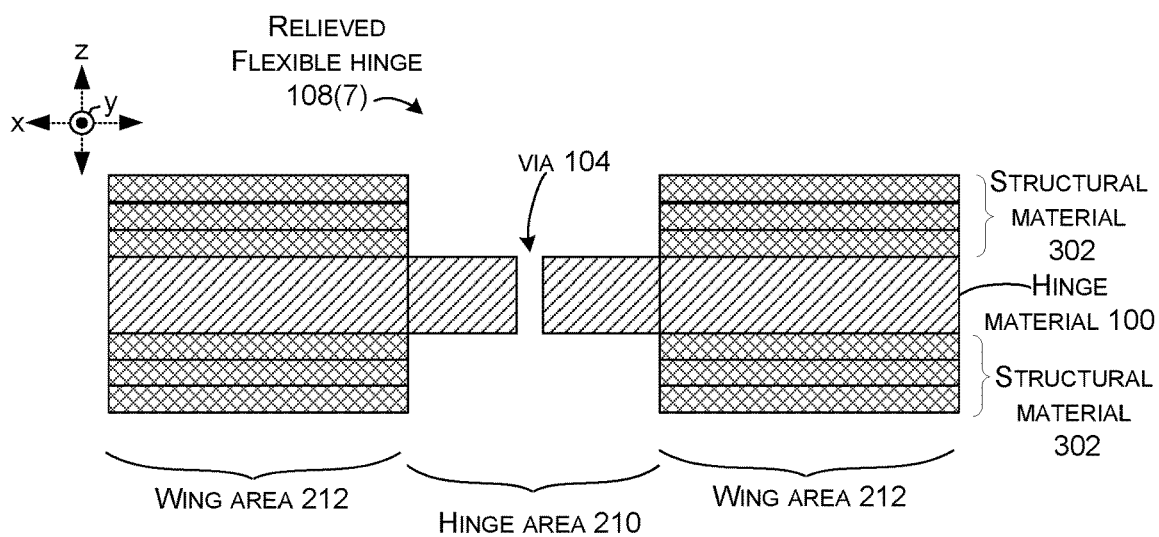

FIGS. 3A-3C collectively illustrate example composite relieved flexible hinge 108 configurations. FIG. 3A shows a sectional view of relieved flexible hinge 108(4) as indicated in FIG. 2C. The configuration illustrated in FIG. 3A can represent a first configuration of relieved hinge material 106(4). The first configuration can entail hinge material 100 in the form of a dry Kevlar weave partially impregnated with (rigid) resins 202, e.g. epoxy limited to areas of the two wings or wing areas 212. The hinge area 210 can entail dry Kevlar with some resin diffused from the wing areas 212 during impregnating.

FIG. 3B illustrates another configuration of relieved flexible hinge 108(6) where the hinge area 210 and the wing area 212 are of similar construction, but the vias 104 located in the hinge area cause the hinge area to tend to flex when forces are imparted on the relieved flexible hinge 108(6) while the wing areas remain relatively rigid. Another composite relieved hinge material 106 configuration can entail dry Kevlar weave fully impregnated with flexible resins, e.g. urethane. The hinge area 210 can be wet Kevlar weave in a urethane matrix.

FIG. 3C shows another example relieved flexible hinge 108(7) configuration where multiple layers of structural material 302 are built up on the wing areas 212, but not the hinge area 210. The multiple layers of structural material 302 can form a composite wing area 212 that is relatively rigid, while vias 104 in the hinge area 210 contribute to its flexibility. For instance, the wing areas 212 can entail multiple structural materials 302, such as dry Kevlar partially impregnated with rigid resins (e.g., polycarbonate) in the wing areas 212 and partially impregnated with flexible resins (TPU) in the hinge area 210. In some of these cases, the wing areas 212 can be laminated with rigid layers, e.g. carbon fiber plus epoxy for mechanical function or easy handling and assembling.

Figure 4A:
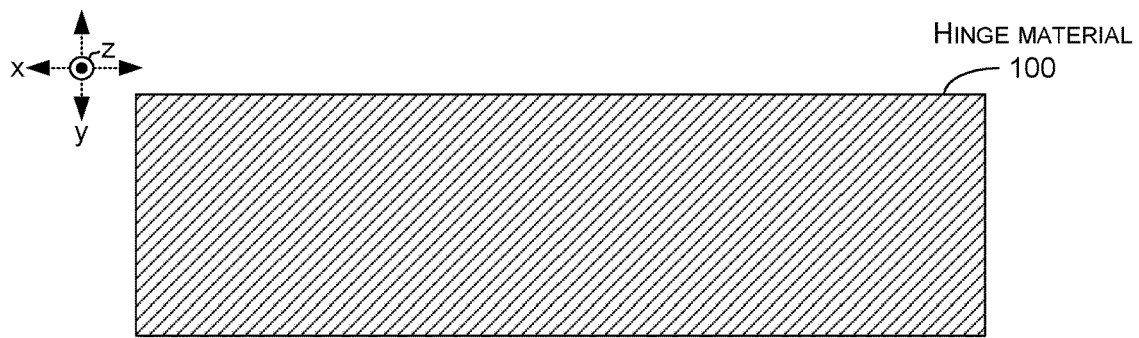
Figure 4B:
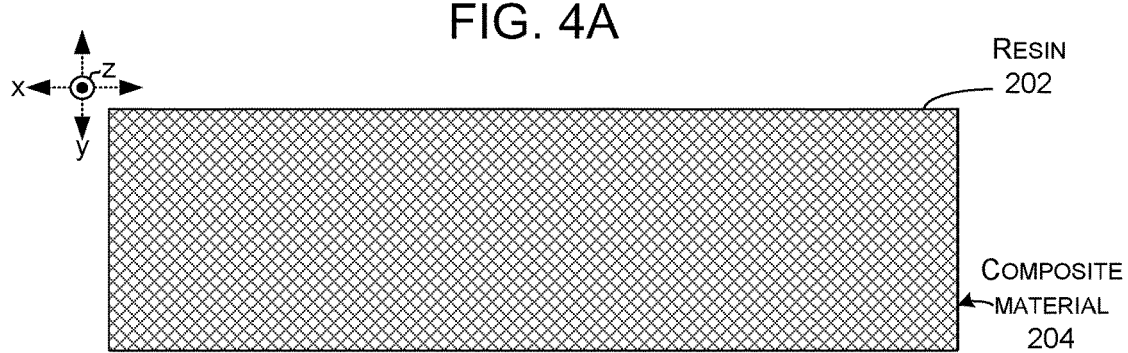
Figure 4C:
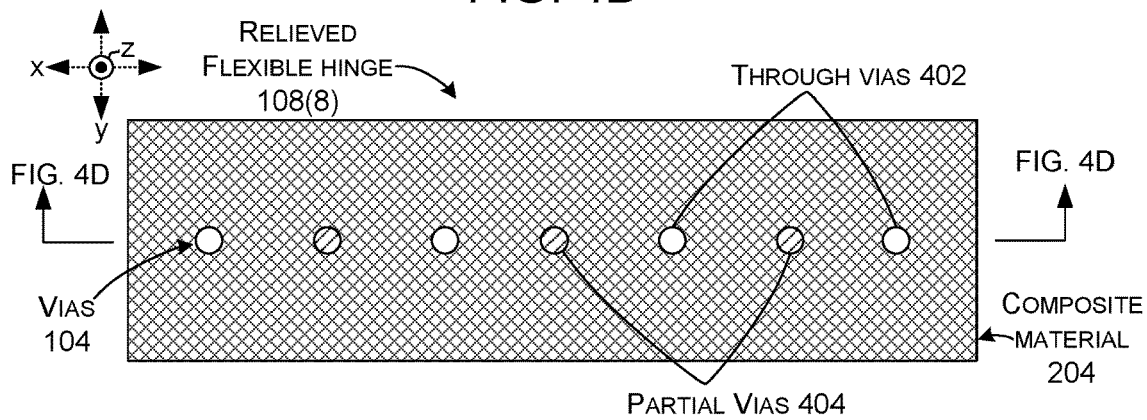
Figure 4D:
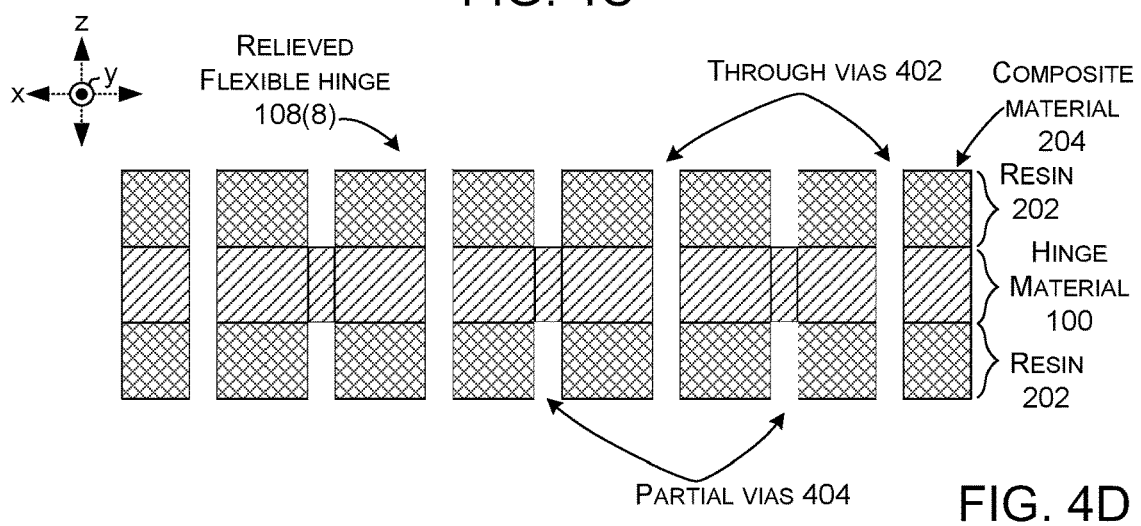

FIGS. 4A-4D collectively show another relieved hinge material configuration. In this case, FIG. 4A shows a hinge material 100. FIG. 4B shows all of the hinge material impregnated with resin 202 to form a composite material 204. In this case, the hinge material has resin or rigid composite plies on both sides (e.g., the material is sandwiched between layers of resin). In other configurations, the resin may only be applied to one side of the hinge material 100. FIGS. 4C and 4D show vias 104 formed in the composite material to customize the properties of the composite material. In this case, some of the vias 104 go all the way through the composite material 204 (e.g., through vias 402) and some go only part way through (e.g., partial vias 404).

FIGS. 5A and 5B show two different relieved flexible hinge configurations. In the relieved flexible hinge 108(9) configuration of FIG. 5A, the hinge material 100 is a single flexible layer of Kevlar weave interposed between two rigid plies of structural material 302, such as carbon fiber in epoxy. In the configuration of FIG. 5B, the hinge material 100 is a flexible layup of multiple Kevlar plies sandwiched between two rigid plies of structural material 302, such as carbon fiber in epoxy. Thus, in some cases, rigid material in the form of composite layers, e.g. carbon fiber in epoxy or polycarbonate are laminated on one side or both sides of flexible hinge material 100. In these illustrated configurations, offset blind or partial vias 404 are formed from both sides of the relieved flexible hinge 108(10). In various configurations, partial vias 404 can be formed in a single layer of Kevlar, multiple layers, or resin/CF-Kevlar-resin/CF laminates.

The relieved flexible hinge 108 may include a single layer of flexible hinge material 100 (FIG. 5A) or multiple layers of flexible hinge material 100(1) and 100(2) (FIG. 5B). In these cases, Kevlar is an example flexible hinge material. In addition to having resins on both sides of the flexible Kevlar, rigid composite plies, e.g. CF impregnated in epoxy or polycarbonate, can be laminated or sandwiched around the flexible hinge material.

FIGS. 6-10 show additional configurations of relieved flexible hinges 108(11)-108(15), respectively.

Figure 6:
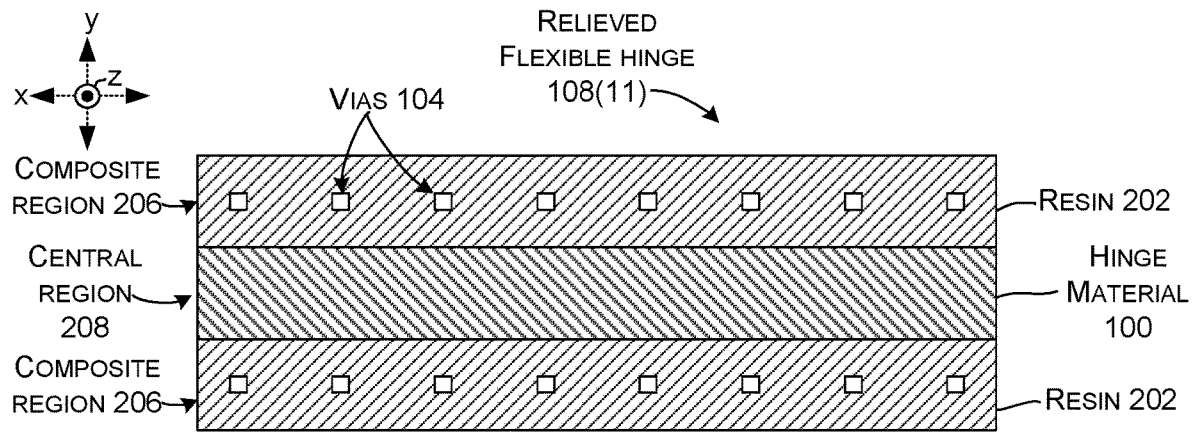

FIG. 6 shows a configuration where the relieved flexible hinge 108(11) includes vias 104 formed in composite regions 206, but not in the central region 208 of hinge material 100. This configuration can promote flexing in the composite regions 206 to accompany flexing in the central region 208. In this example, the vias 104 have a square shape. Other illustrated vias have round shapes. Other via shapes, both regular and irregular, are contemplated.

Figure 7:
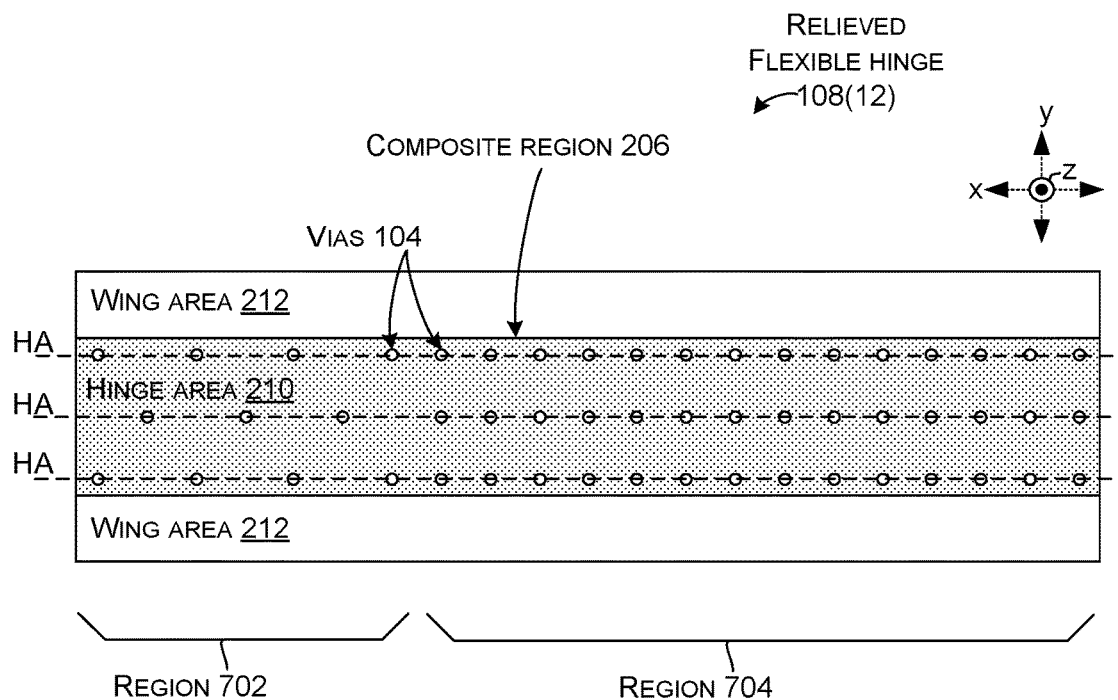

FIG. 7 shows another relieved flexible hinge 108(12). In this case, the hinge area 210 is a composite region 206 and the wing areas 212 are uncoated hinge material 100. Relieved flexible hinge 108(12) has vias 104 arranged along three lines in the hinge area 210 to define three hinge axes (HA). This configuration could promote various hinge properties. For instance, the vias 104 may cause the relatively more rigid composite region 206 to flex in a similar fashion to the uncoated wing areas 212.

In a first region 702, a relatively small density of vias 104 is employed per unit area compared to a second region 704. Such a configuration can facilitate various properties of the relieved flexible hinge 108(12). For instance, the relieved flexible hinge 108(12) could flex easily while limiting region 702 from degradation.

Figure 8:
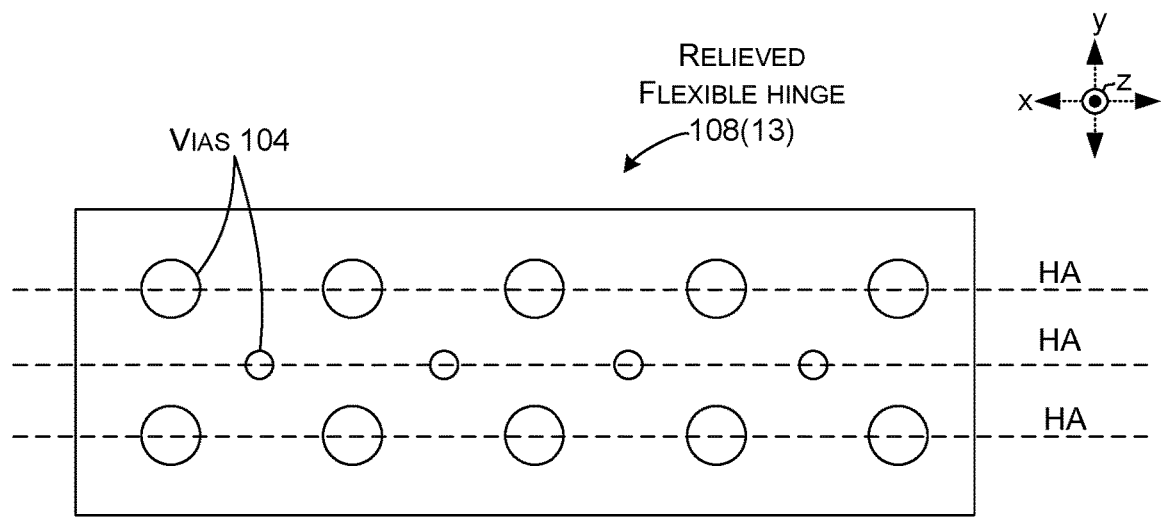

FIG. 8 shows another relieved flexible hinge 108(13). In this case, dashed lines are used to indicate hinge axes (HA) associated with the vias 104. In this example, a line of relatively small vias 104 is interposed between lines of relatively large vias 104. This configuration can promote various desired hinge properties. For instance, in this case, the small vias are centrally located (e.g., along a central hinge axis). The relieved flexible hinge may tend to flex along this central axis more than along the other two hinge axes. The larger vias 104 of the other two hinge axes may cause more uniform flexing along all three hinge axes than would otherwise occur.

Figure 9:
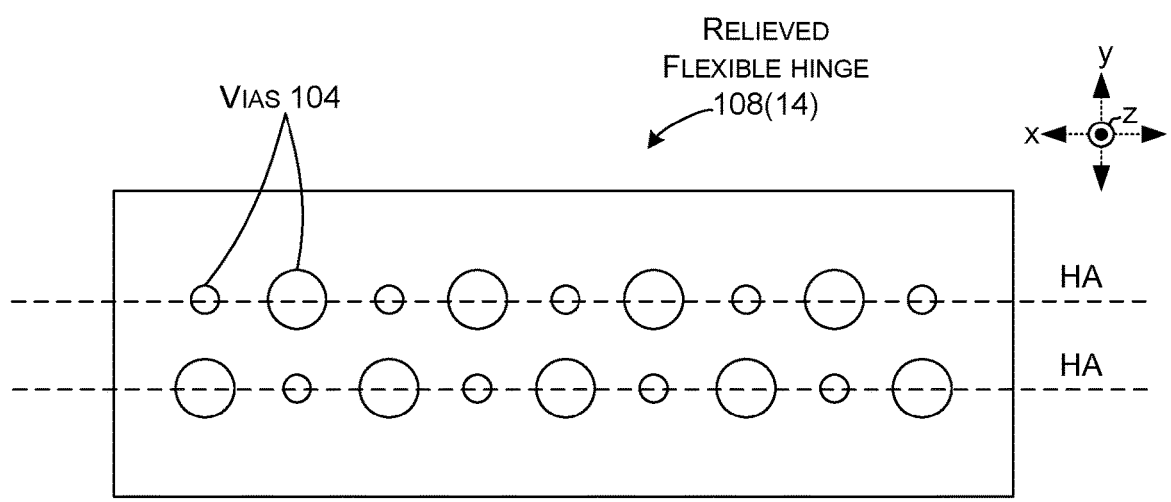

FIG. 9 shows another relieved flexible hinge 108(14). In this case, the size of vias 104 alternates or otherwise changes along a hinge axis (HA). In this example, relatively small and large vias 104 alternate along an individual hinge axis. Further, the pattern is offset in the adjacent hinge axis to avoid overly weakening the relieved flexible hinge 108(14).

Stated another way, the vias 104 can alter properties associated with the relieved flexible hinge 108 and produce flexing relative to the indicated axis. From one perspective, vias 104 can locally weaken the relieved flexible hinge. This weakening can promote flexing/bending along a hinge axis. The hinge axis/axes can be defined by the pattern and/or size of the vias 104. From another perspective, vias alter properties of hinge materials and combinations of vias 104 in various shapes and/or sizes can result in tailored folding curvatures and mechanical responses. In the configurations above, the hinge axes defined by the vias 104 have been generally parallel to one another. An example is provided below that relates to multiple hinge axes, at least some of which are not parallel to one another.

Figure 10:
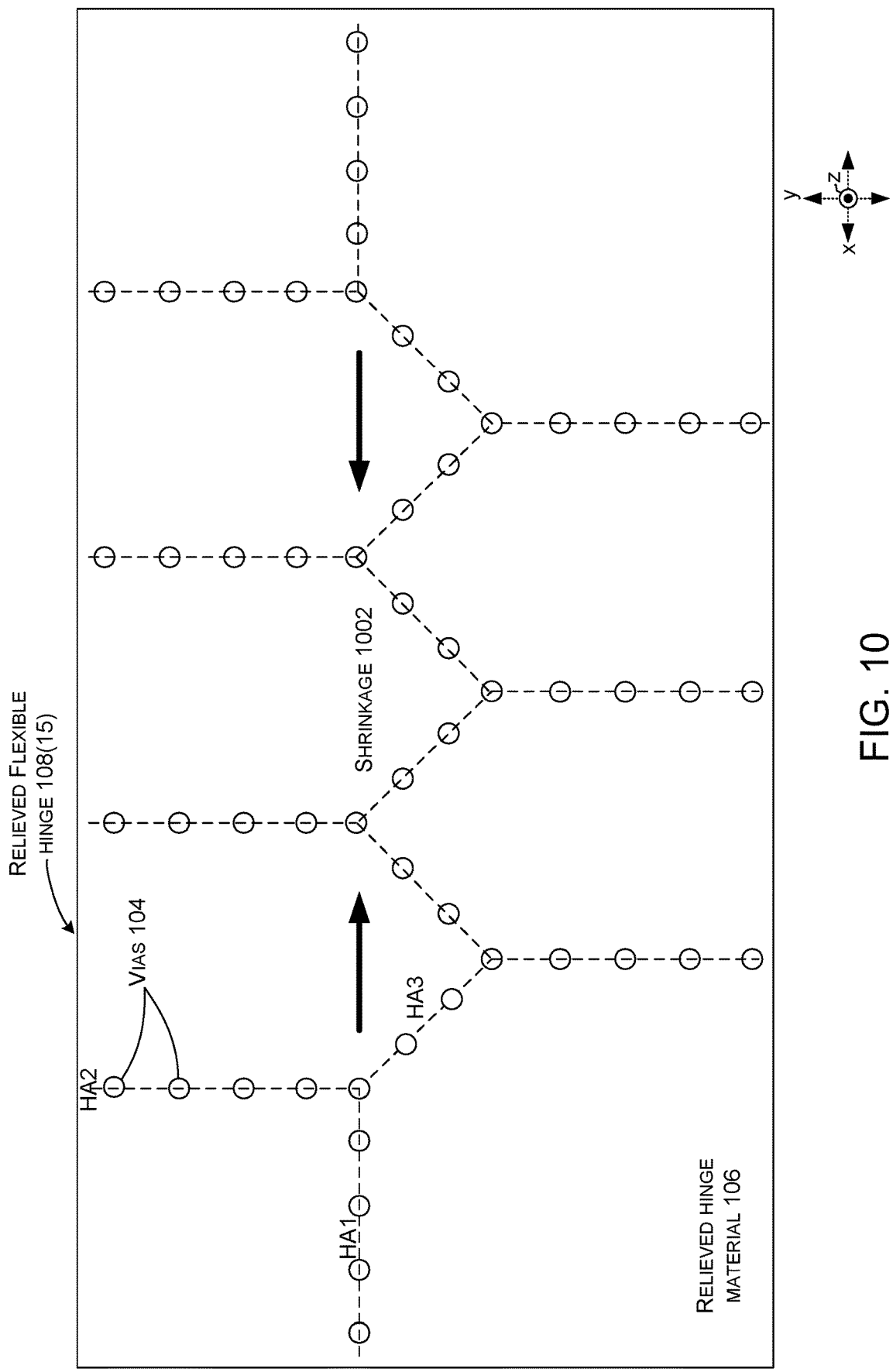
Figure 11A:
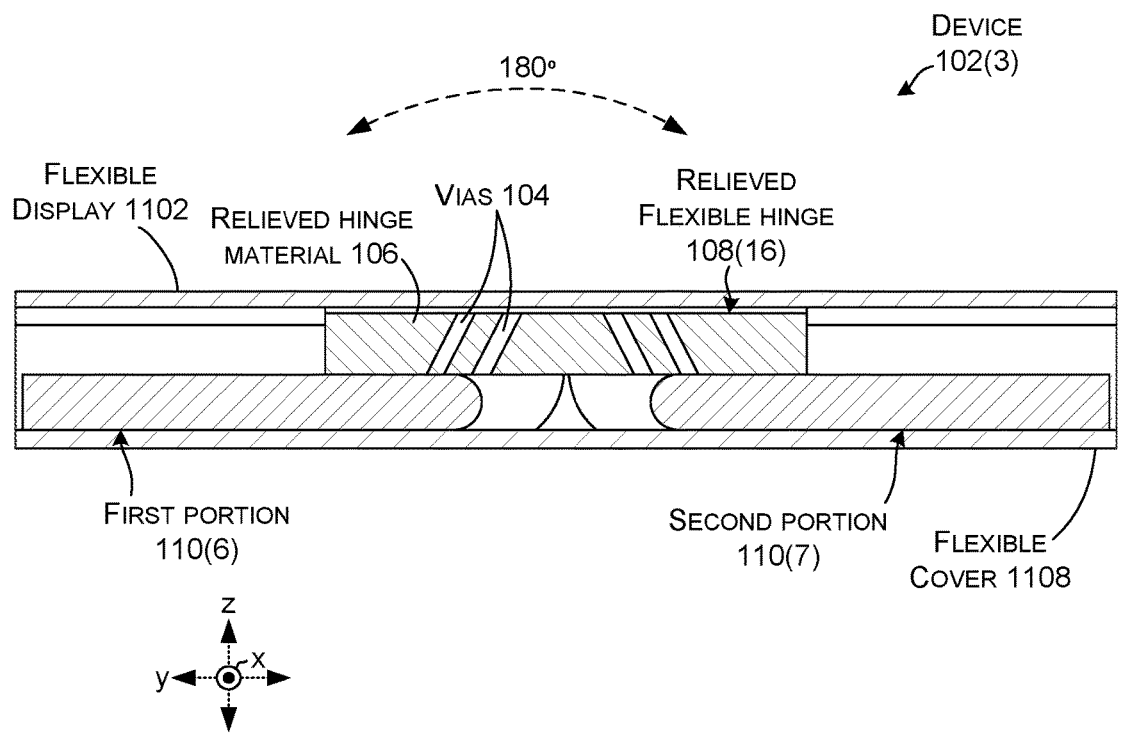
Figure 11B:
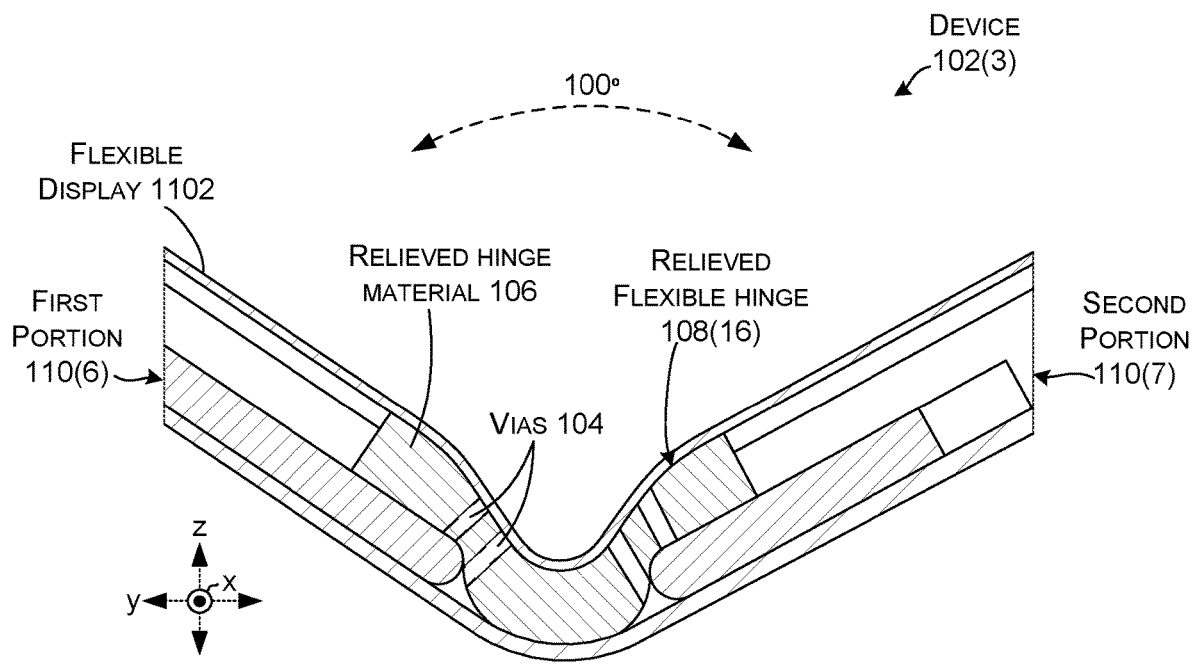
Figure 12A:
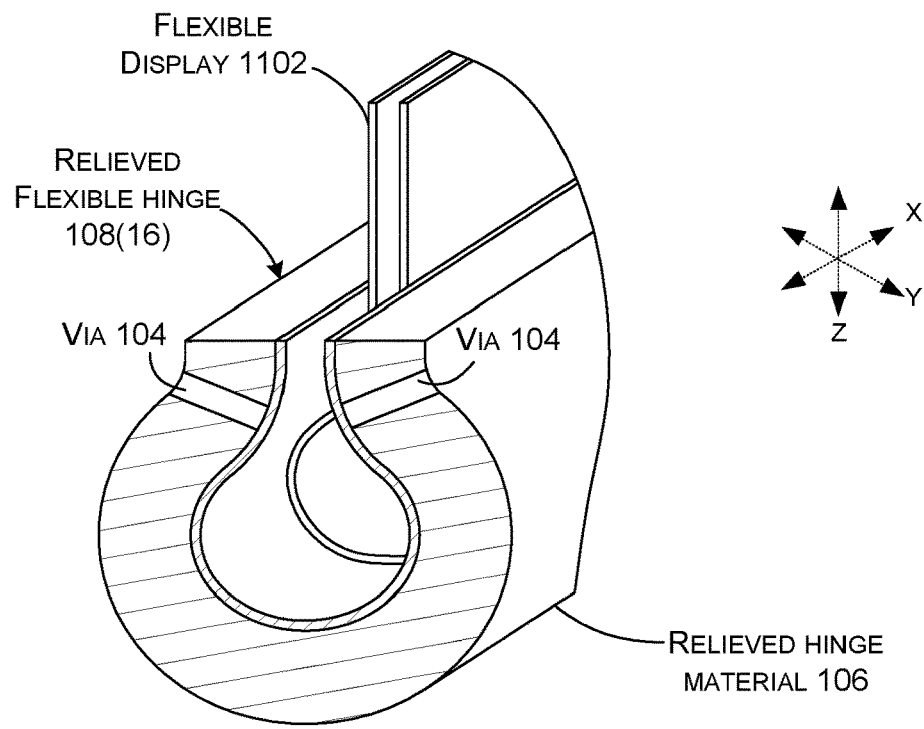
Figure 12B:
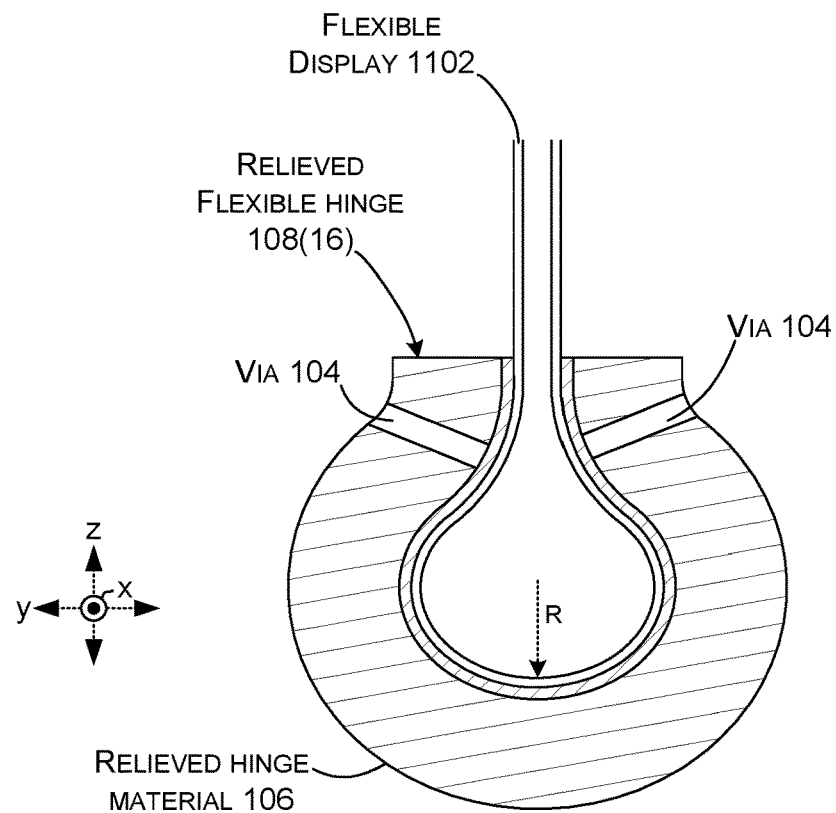

FIG. 10 represents another relieved flexible hinge 108 (15). In this case, the relieved hinge material 106 includes multiple arrays of vias 104. The vias 104 can facilitate flexing along multiple hinge axes, which are indicated with dashed lines. In this case, the flexing can be along at least a first hinge axis (HA1), a second hinge axis (HA2), and an additional hinge axis (HA3). In this example, the first hinge axis is generally vertical on the drawing page (e.g., parallel to the longer sides of the relieved hinge material 106). There are seven second hinge axes that are perpendicular to the first hinge axis, and six additional hinge axes that form oblique angles relative to first and second hinge axes, and in this case extend between the first and second hinge axes. This can create an origami configuration, which can cause dimensional shrinkage or bending as indicated at 1002 on the drawing page.

FIGS. 11A and 11B and 12A and 12B collectively illustrate another example relieved flexible hinge 108(16). In this case, the relieved flexible hinge 108(16) can be employed in cooperation with a flexible display 1102 that extends from a first portion 110(6) across the relieved hinge material 106 and to a second portion 110(7). A flexible cover 1104 can cover the device opposite the flexible display 1102. The relieved hinge material 106 can include vias 104 that are selectively placed to promote flexibility of the relieved flexible hinge 108(16) at desired locations and less flexibility at other locations to avoid crimping the flexible display 1102 when the device is rotated from an open 180-degree orientation of FIG. 11A to other lesser angles, such as the 100-degree orientation of FIG. 11B and culminating in the zero-degree closed orientation of FIGS. 12A and 12B. Note that as can be appreciated from FIG. 11A, in this implementation, the vias 104 are not oriented orthogonal to a major surface (that lies parallel to the xy-reference plane) of the relieved hinge material 106, but instead lie at an oblique angle. Of course, other numbers, sizes, patterns, and/or locations of vias 104 are contemplated on the relieved hinge material 106 to facilitate desired hinge properties.

One point of novelty described herein can be the ability to make generic flexible hinges and customize the hinges for various design criteria by relieving portions of the hinge material. For instance, in some cases the flexible hinges can be relieved with a line, multiple lines, or a pattern of micro or nano vias 104 (e.g., holes) that can be drilled by laser or other methods along the length (or a portion thereof) to form the relieved flexible hinge 108. The vias 104 can be any size, from micron sized to millimeter size and may be visible or invisible to the user. Relieved flexible hinge 108 performance can be optimized by vias 104 of various diameters, numbers, and/or patterns. This is a very efficient way to make composite tape hinges with the mechanical performance specified. Moreover, it is also a method to adjust the hinge performance and narrow the production deviations.

The present concepts provide a much more efficient way to develop flexible hinges with optimized performance, e.g., relieved flexible hinges. The concepts also provide a feasible method to adjust the hinge performance back to design specifications from production deviations, even after the flexible hinges are fully cured. For instance, if the flexible hinge tests stiffer than the design parameter tolerances, vias can be strategically formed in the flexible hinge and the hinge tests can be repeated.

The present concepts can be employed with various types of fibers including at least Kevlar, carbon fiber, LCP, etc. The fibers can have various modulus and strength of fibers. The fibers can be woven, e.g., plain, twill, or others. Various types of resins can be employed, such as epoxy, PUR/TPU, etc.

The conventional way of developing a flexible hinge requires a huge amount of time, money, and effort to identify the right tape hinge recipe(s). The production deviations of flexible hinges may cause hinge performance changes. However, traditional flexible hinges cannot be adjusted after the composite layup is cured.

In contrast, the present implementations can enhance/optimize flexible hinge performance by micro/nano drilling to form relieved flexible hinges. Some implementations can entail layup of a generic tape hinge, which can be based on fabric with a reasonably high modulus, resins in reasonable modulus/hardness, single type of weave, and one or more number of layers. The generic tape hinges can be adjusted by laser drilling holes in micro or nanometer scale along the length direction of the composite hinge. Laser drilling cuts fibers in the composite hinge. By reducing the amount of continuous fibers, the hinge's mechanical strength and modulus in hinge area are adjusted as desired. This method not only simplifies and accelerates the development of flexible hinges with the defined torque but also can be used to narrow deviation in mass production. Stated another way, hinges that when tested have a greater resistance to bending than specified can have vias and/or additional vias formed therein to bring the bending resistance within specifications, for instance.

The present relieved flexible hinge concepts can be utilized with any type of device, such as but not limited to, notebook computers, smart phones, wearable smart devices, tablets, and/or other types of existing, developing, and/or yet to be developed devices.

Although techniques, methods, devices, systems, etc., pertaining to relieved flexible hinges are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion and a second portion and a relieved flexible hinge rotatably securing the first and second portions, the relieved flexible hinge comprising a flexible hinge material that includes a hinge area interposed between wing areas, the flexible hinge material of at least the wing areas is coated with resin and the flexible hinge material of the hinge area defining multiple linearly arranged vias that weaken the flexible hinge material to define a hinge axis along which the relieved flexible hinge flexes when the first and second portions are rotated through a range of orientations.

Another example can include any of the above and/or below examples where the vias define multiple hinge axe.

Another example can include any of the above and/or below examples where the multiple hinge axes are parallel to one another.

Another example can include any of the above and/or below examples where the multiple hinge axes define an origami shape.

Another example can include any of the above and/or below examples where both the hinge area and the wing areas are coated with the resin.

Another example can include any of the above and/or below examples where the flexible hinge material comprises multiple layers of flexible material.

Another example can include any of the above and/or below examples where the wing areas secure the flexible hinge material to the first and second portions.

Another example includes a device comprising a first portion and a second portion and a relieved flexible hinge rotatably securing the first and second portions, the relieved flexible hinge comprising a flexible hinge material having multiple vias formed therein that weaken the flexible hinge material to define at least one hinge axis along which the relieved flexible hinge flexes when the first and second portions are rotated through a range of orientations relative to one another.

Another example can include any of the above and/or below examples where the vias are arranged linearly or wherein the vias are not arranged linearly.

Another example can include any of the above and/or below examples where the vias define multiple hinge axes.

Another example can include any of the above and/or below examples where the multiple hinge axes are parallel to one another.

Another example can include any of the above and/or below examples where at least some of the multiple hinge axes are not parallel to one another.

Another example can include any of the above and/or below examples where the vias are all the same size.

Another example can include any of the above and/or below examples where the vias that define an individual hinge axis are all the same size but are a different size from the vias that define another individual hinge axis.

Another example can include any of the above and/or below examples where the vias that define an individual hinge axis are of differing sizes.

Another example can include any of the above and/or below examples where the vias that define an individual hinge axis are evenly spaced in the flexible hinge material along the hinge axis.

Another example includes a device comprising a first portion and a second portion and a relieved flexible hinge rotatably securing the first and second portions.

Another example can include any of the above and/or below examples where the relieved flexible hinge comprises a rubber material, a fabric material, or a fabric-resin composite material.

Another example can include any of the above and/or below examples where the relieved flexible hinge includes multiple vias arranged in the rubber material, the fabric material, or the fabric-resin composite material relative to a hinge axis.

Another example can include any of the above and/or below examples where the relieved flexible hinge defines a thickness, and wherein at least some of the vias pass through an entirety of the thickness.

Another example can include any of the above and/or below examples where the relieved flexible hinge defines a thickness and wherein at least some of the vias do not extend through an entirety of the thickness.

Another example can include any of the above and/or below examples where the relieved flexible hinge defines multiple vias arranged relative to multiple hinge axes.

The invention claimed is:

1. A device, comprising:
   a first portion and a second portion; and,
   a relieved flexible hinge defining a hinge axis and rotatably securing the first and second portions through a range of orientations from a closed orientation where the first and second portions are positioned against one another to an open orientation where the first and second portions are angled away from one another, the relieved flexible hinge comprising a woven fabric hinge material that defines multiple linearly arranged vias that are centrally located on the woven fabric hinge material along the hinge axis and are spaced back from each edge of the woven fabric hinge material on the hinge axis.

2. The device of claim 1, wherein the vias define multiple hinge axes.

3. The device of claim 2, wherein the multiple hinge axes are parallel to one another.

4. The device of claim 1, wherein the relieved flexible hinge further comprises first and second wing areas that are parallel to the hinge axis and that are secured to the first and second portions.

5. The device of claim 4, wherein the woven fabric hinge material is coated with resin along the hinge axis and along the first and second wing areas.

6. The device of claim 1, wherein the woven fabric hinge material comprises multiple layers of flexible material.

7. The device of claim 4, wherein the first and second wing areas secure the woven fabric hinge material to the first and second portions parallel to the hinge axis.

8. A device, comprising:
   a first portion and a second portion; and,
   a relieved flexible hinge defining a hinge axis and rotatably securing the first and second portions through a range of orientations, the relieved flexible hinge comprising a flexible woven fabric hinge material defining multiple linearly arranged vias positioned along the hinge axis that weaken the flexible woven fabric hinge material and that are intersected by the hinge axis.

9. The device of claim 8, wherein the vias define multiple hinge axes.

10. The device of claim 9, wherein the multiple hinge axes are parallel to one another.

11. The device of claim 9, wherein at least some of the multiple hinge axes are not parallel to one another.

12. The device of claim 9, wherein the vias are all the same size.

13. The device of claim 9, wherein the vias that define an individual hinge axis are all the same size but are a different size from the vias that define another individual hinge axis.

14. The device of claim 9, wherein the vias that define an individual hinge axis are of differing sizes.

15. The device of claim 9, wherein the vias that define an individual hinge axis are evenly spaced in the flexible woven fabric hinge material along the hinge axis and do not contact edges of the flexible woven fabric which are perpendicular to the hinge axis.

16. A device, comprising:
a first portion and a second portion; and,
a flexible hinge defining a hinge axis and rotatably securing the first and second portions through a range of orientations around the hinge axis, the flexible hinge comprising woven fabric extending along the hinge axis from a first edge to a second edge and defining multiple vias distributed along the hinge axis.

17. The device of claim 16, wherein the woven fabric is impregnated with resin.

18. The device of claim 16, wherein the vias are all the same size.

19. The device of claim 16, wherein the flexible hinge defines a thickness, and wherein at least some of the vias pass through an entirety of the thickness.

20. The device of claim 18, wherein the flexible hinge defines a thickness and wherein at least some of the vias do not extend through an entirety of the thickness.

* * * * *